June 2, 1970 R. W. HOUSER 3,515,488
FILM EXAMINING APPARATUS FOR DETECTING FLAWS IN A CONTINUOUSLY
MOVING FILM WEB IN WHICH A DELAY CIRCUIT IS USED TO PERMIT
DERIVING BOTH THE BLANKING SIGNAL AND THE INSPECTION
SIGNAL FROM A SINGLE LIGHT SOURCE
Filed Jan. 8, 1968
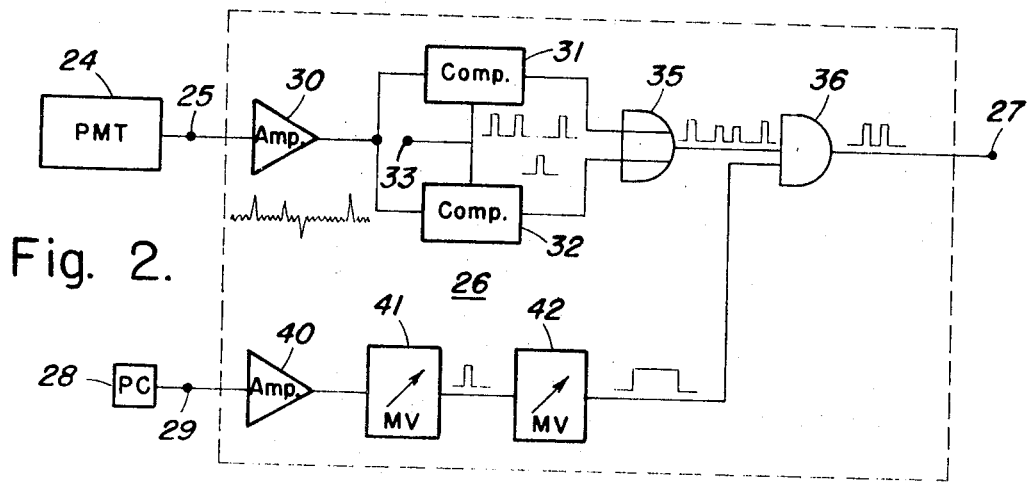
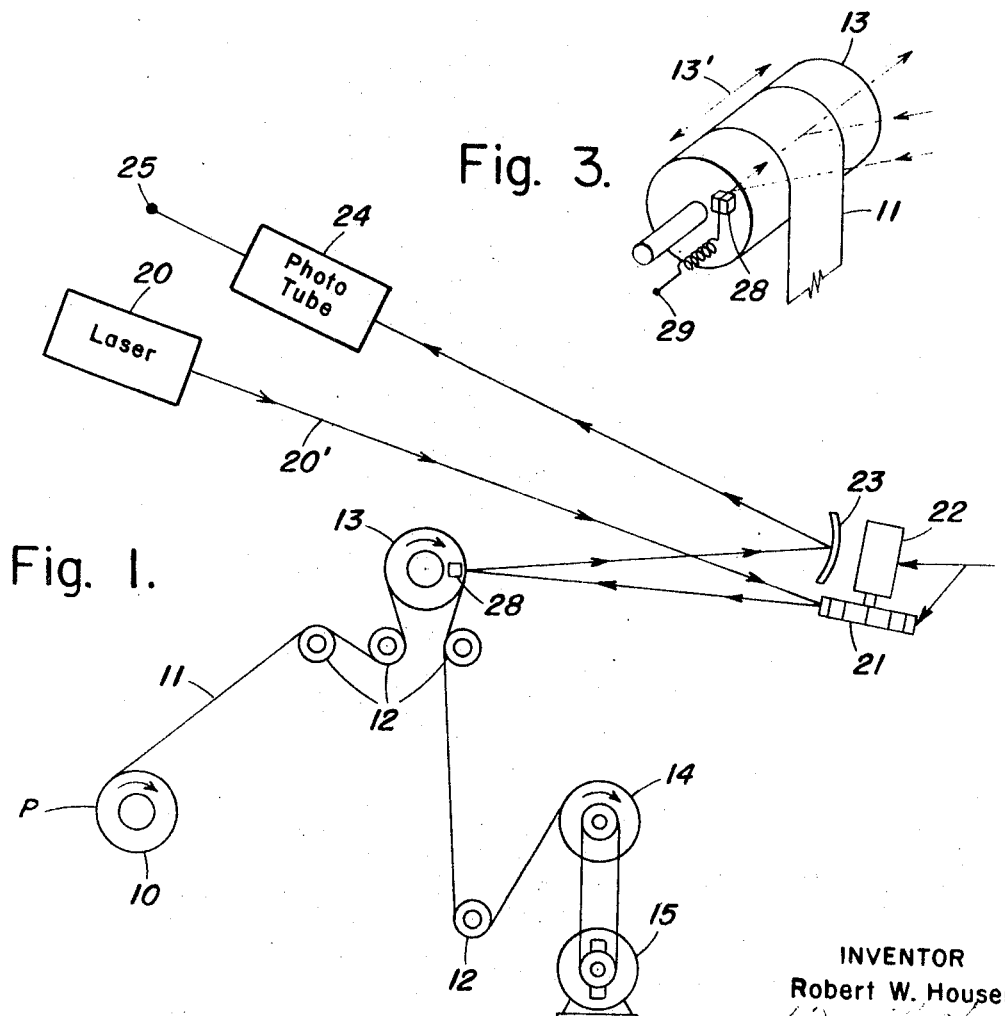
INVENTOR
Robert W. Houser
BY
ATTORNEY United States Patent Office 3,515,488
Patented June 2, 1970

3,515,488
FILM EXAMINING APPARATUS FOR DETECTING FLAWS IN A CONTINUOUSLY MOVING FILM WEB IN WHICH A DELAY CIRCUIT IS USED TO PERMIT DERIVING BOTH THE BLANKING SIGNAL AND THE INSPECTION SIGNAL FROM A SINGLE LIGHT SOURCE
Robert W. Houser, Vestal, N.Y., assignor to GAF Corporation, New York, N.Y., a corporation of Delaware
Filed Jan. 8, 1968, Ser. No. 696,285
Int. Cl. H01j 39/12; H01n 21/30; G01n 21/16
U.S. Cl. 356—200                     6 Claims

ABSTRACT OF THE DISCLOSURE

A laser beam is directed to a web of film, and a reflected beam is picked up by a photomultiplier tube. To distinguish between edge and defect signals, and further to read defect signals which increase or decrease the intensity of the reflected beam, an electronic recognition circuitry is provided which includes a pair of reference comparators to compare average, low defect outputs from the photomultiplier tube with the actual output and providing trigger pulses whenever there is a substantial change, in increasing or decreasing direction; a second photoelectric cell is located next to the web, energized upon the beginning of a transverse scan, triggering a time delay circuit adjusted for the scanning time from the cell to the edge of the film, which in turn triggers a one-shot multi-vibrator adjusted to have a pulse time corresponding to the width of the film. Output from the second one-shot multi-vibrator and from the defect comparators are combined in an AND Gate, to provide a defect signal only when the beam is actually on the web of film.

---

The present invention relates to film examining apparatus, and more particularly to apparatus examining webs of film for defects, such as scratches, tears, lack of emulsion or the like, by sensing changes in reflected or transmitted light caused by a defect.

Film testing or examining apparatus, in which a small spot of light is swept rapidly across the width of the film, has previously been proposed. Rather wide webs of film which are red-blind, can readily be examined by using a laser beam, which provides a sharply collimated beam of small spot size in the red wavelength region. Such beam is of high intensity and does not contain any stray or unwanted yellow or blue components, as obtained from an incandescent light source, even with the best filters, and thus lends itself to scanning rapidly across a web of film, for example of 14 inches width, which is red-blind, such as X-ray film, photographic paper and the like.

As the speed of scanning across a web of film increases, made possible by high intensity laser beams, the difficulty of discriminating between signals generated when the beam strikes the edge of a film from actual defects is additionally increased. The film testing apparatus is ordinarily connected to an alarm, or a recorder or counter, which indicates whenever a defect is sensed. It is important that only true defects are indicated, that is that edge signals are eliminated without suppression of any defect signals which are wanted.

Briefly, in accordance with the present invention, the film examining apparatus includes a means to generate a small spot of light, preferably a laser, and a scanning means to scan the spot over the web of film to be examined. A polygonal mirror such as a twelve sides mirror driven by a motor at, for example, 3,600 r.p.m. is satisfactory. The scan beam, after having been reflected from the web of film, is picked up by an electro-optical pickup device, such as a photomultiplier tube. Additionally, a second electro-optical pickup, such as a photo cell, is located near the edge of the web and in line with the scanning beam. The output of the photomultiplier tube is compared with a reference level, adjusted to the average of the output of the tube when no defect is present. A pair of comparators are used, one to detect increases from the average reference level and the other to detect decreases therefrom.

To eliminate unwanted edge signals, which will appear as pulses at the output of the photomultiplier tube, the photo-electric cell is used to trigger a first monostable multi-vibrator, the pulse length of which is adjusted to correspond to the scanning time of the beam from the photo-electric cell to the edge of the web of film to be tested. The first monostable multi-vibrator then triggers a second monostable multi-vibrator, the pulse time of which is adjusted to match the scanning time of the beam across the width of the web.

The output from the comparator and from the second multivibrator are combined, for example in an AND-gate. Thus, edge signals occurring as the beam scans the edge of the film, are eliminated since the second multi-vibrator provides a signal only when the beam is on the film web; on the other hand, all defect signals, that is those which increase or decrease the output from the photomultiplier tube, will provide an output at the AND-gate.

It is accordingly an object of the present invention to provide a film examining apparatus which is capable of scanning wide webs of film.

It is a further object of the present invention to provide a film examining apparatus in which unwanted signals caused by a scanning beam passing the edge of the film are automatically rejected.

It is an additional object of the present invention to provide a film examining and testing apparatus in which defects causing variations in output of detected light in increasing as well as in decreasing direction are detected.

It is still another object of the present invention to provide a film testing and examining apparatus in which a laser beam is swept across a web of film and unwanted edge signals are electronically eliminated without the use of mechanical devices connected to the sweeping mechanism.

These and other objects and many of the attendant advantages of this invention will be readily appreciated as the same becomes better understood by reference to the following detailed description when considered in connection with the accompanying drawings, in which:

FIG. 1 is a general schematic diagram of the apparatus of the present invention;

FIG. 2 is a block diagram of the electronic circuitry in connection therewith; and FIG. 3 is a perspective view of examining roll or drum and the photo cell arrangement used in connection therewith.

Referring now particularly to the drawings, wherein like reference characters designate like or corresponding parts throughout the several views, FIG. 1 illustrates an inspection system for a web of film 11 stored on a pay-out drum 10, and traveling over idler rollers 12, an inspection roller or drum 13 to a takeup roll 14, Takeup roll 14 is driven in conventional form by a motor 15.

A laser 20, such as a helium-neon laser, provides a sharply collimated narrow beam, for example of a spot size of 2 mm. diameter, schematically indicated at 20', and directed to a 12-sides mirror 21, driven by a motor 22, for example at a speed of 3,600 r.p.m. The beam is thus scanned laterally across drum 13, as schematically indicated by arrow 13' (FIG. 3). The reflection from drum 13, and the film thereon to the extent that the drum is covered by film, is directed to a spherical mirror 23, and then impinges on a photo-electric pickup 24, such as a photomultiplier tube. Photomultiplier tube 24 has its output connected to a terminal 25.

Referring now to FIG. 3, beam 20' sweeps laterally of the web 11, as indicated by arrow 13', and first impinges on a photo-electric cell 28, as indicated by the beam broken lines. As the beam continues to sweep toward the right (FIG. 3) it will next impinge on the edge of web 11, causing an output signal to appear at terminal 25. Any defects of the web 11 will cause further signals. A position of beam on the film is indicated by the chain dotted lines.

Further sweep of the beam will bring it to the right-hand edge of the web, causing yet another signal. The width of the mirrors is so adjusted that, as the beam reaches the furthest limit of the drum 13, another mirror face is presented to beam 20' so that the scanning from left to right starts anew.

The electronic circuitry, generally indicated at 26 in FIG. 2, is connected to the output 25 from photomultiplier tube 24, as well as to the output 29 from photo cell 28. The output of circuit 26 is available at terminal 27, where an alarm signal can be indicated, or the number of defects recorded or defect signals otherwise processed.

The wave shapes appearing at the outputs of the various electronic components are indicated adjacent thereto. Photomultiplier tube 24 is connected to an amplifier 30, the output of which is applied to a pair of comparators 31, 32. A typical scanning signal is indicated next to amplifier 30. The signal has an average, quiescent value, then a large positive excursion indicating the left edge of the web 11; then quiescent value, a small positive excursion indicating a point of increased reflectivity, that is a variation from average. A tear, or lack of emulsion would be indicated by a signal having a lesser output, such as the next negative going excursion. Another large signal indicates the right hand edge of the web. This signal is applied to comparators 31, 32 where the signals are compared with a reference applied from a source 33 and corresponding to the average signal obtained from the film when no defects are present, as determined for example by experiment. The comparators 31, 32 will be triggered and provide an output if, and only if the reference is exceeded by a predetermined amount. Output from comparators 31, 32 is applied to an OR-gate 35, the output of which is applied to one terminal of an AND-gate 36. The input from the photomultiplier tube 24 thus is a pulse representation of composite edge and defect signals. The output from photocell 28, appearing at terminal 29, is amplified by an amplifier 40 and applied to a first one-shot, or monostable multi-vibrator 41, having an adjustable pulse time, as schematically indicated by the arrow. The pulse time of the first one-shot multi-vibrator 41 is adjusted to correspond to the sweep time of the beam from the photo cell 28 to the left hand of the web 11.

The trailing edge of the pulse from first monostable multi-vibrator 41 is used to trigger a second one-shot multi-vibrator 42, likewise having an adjustable pulse time. The second monostable multi-vibrator 42 has its pulse time adjusted to correspond to the sweep time of the beam across the web 11, which will ordinarily be considerably longer than the time of monostable multi-vibrator 41. The output of the second one-shot multi-vibrator 42, is applied as the second input to the AND-gate 36.

The AND-gate 36 will thus have an output only when the light is on the film, and when there is a defect, in other words when an "on-film" signal is available from one-shot multi-vibrator 42 and a "defect" signal is applied by OR-gate 35. This output, appearing at terminal 27, can be utilized to energize a relay driver to operate an alarm relay or other circuits.

With minor modifications, such as moving the light beam across the film between a pair of rollers and mounting the photo-multiplier tube 24 on the opposite side of the web, defects can be detected by sensing changes in transmitted light, rather than by sensing changes in reflected light as indicated in FIG. 1. Since defects, both from reflected or transmitted light, may either increase or decrease the amount of light which reaches the photomulitplier tube, two voltage comparators 31, 32 have been shown, although the function can be combined in a single unit.

It should also be understood that the foregoing relates only to a preferred embodiment of the invention and that it is intended to cover all changes and modifications of the example of the invention herein chosen for the purposes of the disclosure, which do not constitute departures from the spirit and scope of the invention.

What is claimed is:

1. Film examining apparatus for detecting flaws in a continuously moving web of film, comprising:
    means generating a small single spot of light;
    means scanning said spot transversely across the so moving web;
    first electro-optical pickup means in reflected light receiving relation to said spot after having transversely scanned said web and providing a signal output upon deviation of reflected light from an average value, as said web is being so scanned;
    second electro-optical means comprising a photo cell located in direct light receiving relation to said same spot when the spot is adjacent the edge of the web prior to the beginning of each scan; and
    detection means having said signal output applied thereto and providing a defect signal, said detection means detecting a change in signal level and providing an output pulse upon detection of such change; wherein the improvement comprises,
    first adjustable time means generating an "off-web" signal corresponding to the scanning time of the spot in moving from the photo cell of said second electro-optical means to the adjacent edge of said web being scanned;
    second adjustable time means generating an "on-web" signal corresponding to the scanning time of the spot in actually moving across said web; and
    means combining said "on-web" signal and said "defect" signal to provide output defect signals only when said web is actually being scanned by such single spot.

2. Apparatus as defined in claim 1, wherein the photo cell of said second electro-optical means is mounted near but in spaced relationship to the edge of said continuously moving web.

3. Apparatus as defined in claim 2, wherein said web is passed over a drum, and said photo cell is mounted near the drum at the side where each scan of the spot across the web begins.

4. Apparatus as defined in claim 1, wherein said first and said second time adjustable means are one-shot multi-vibrator circuits.

5. Apparatus as defined in claim 1, wherein said combining means is an AND-gate.

6. Apparatus as defined in claim 1, wherein said first electro-optical means is a photo-multiplier tube and said detection means includes a pair of voltage comparators for comparing the output of said photomutliplier tube with a voltage representative of a signal when no defect is present, one comparator triggering upon increase in the photomultiplier tube signal level and the other triggering upon decrease in the photomultiplier tube signal level.

References Cited
UNITED STATES PATENTS 3,026,415   3/1962   Lake et al. _____ 250—219

RALPH G. NILSON, Primary Examiner

T. N. GRIGSBY, Assistant Examiner

U.S. Cl. X.R.

250—209, 219

Disclaimer 3,515,488.—*Robert W. Houser*, Vestal, N.Y. FILM EXAMINING APPARATUS FOR DETECTING FLAWS IN A CONTINUOUSLY MOVING FILM WEB IN WHICH A DELAY CIRCUIT IS USED TO PERMIT DERIVING BOTH THE BLANKING SIGNAL AND THE INSPECTION SIGNAL FROM A SINGLE LIGHT SOURCE. Patent dated June 2, 1970, Disclaimer filed Sept. 30, 1982, by the assignee, *Eastman Kodak Co.*

Hereby enters this disclaimer to all claims of said patent.
[*Official Gazette March 8, 1983.*]